(12) United States Patent
Chen et al.

(10) Patent No.: US 6,648,429 B2
(45) Date of Patent: Nov. 18, 2003

(54) COMPUTER ENCLOSURE WITH DRIVE BRACKET

(75) Inventors: Yun-Lung Chen, Tu-Chen (TW); Jung-Chi Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 15 days.

(21) Appl. No.: 10/085,392

(22) Filed: Feb. 27, 2002

(65) Prior Publication Data

US 2003/0080654 A1 May 1, 2003

(30) Foreign Application Priority Data

Oct. 26, 2001 (TW) .......................................... 90218391U

(51) Int. Cl.[7] ................................................ G06F 1/16
(52) U.S. Cl. ..................................... 312/223.2; 361/685
(58) Field of Search ........................... 312/223.1, 223.2, 312/257.1, 263; 361/683, 684, 685, 686, 724, 725

(56) References Cited

U.S. PATENT DOCUMENTS

| | | | | |
|---|---|---|---|---|
| 5,269,598 A | * | 12/1993 | Liu | 312/223.2 |
| 5,726,864 A | * | 3/1998 | Copeland et al. | 361/800 |
| 5,884,988 A | * | 3/1999 | Foo et al. | 312/223.2 |
| 5,921,644 A | * | 7/1999 | Brunel et al. | 312/223.2 |
| 6,227,631 B1 | * | 5/2001 | Lin et al. | 312/223.2 |
| 6,293,636 B1 | * | 9/2001 | Le et al. | 312/223.2 |
| 6,473,313 B1 | * | 10/2002 | Chen et al. | 361/801 |
| 6,529,373 B1 | * | 3/2003 | Liao et al. | 361/685 |

* cited by examiner

Primary Examiner—Janet M. Wilkens
(74) Attorney, Agent, or Firm—Wei Te Chung

(57) ABSTRACT

A computer enclosure includes a base (10), a removable first side plate (90), and a drive bracket (30). The base has a front plate (12), a second side plate (14), a rear plate (15), and a bottom plate (16). The drive bracket is adapted to accommodate different sized disk drives. The drive bracket has a base plate (32) and a pair of side walls (34, 36). A rack (38) is formed adjacent one of the side walls. A pair of shelves (46) is respectively formed on the rack and the other side wall. A distance between the side walls is dimensioned to receive a large disk drive. A distance between the said other side wall and the rack is dimensioned to receive a small disk drive.

21 Claims, 5 Drawing Sheets

COMPUTER ENCLOSURE WITH DRIVE BRACKET

BACKGROUND OF THE INVENTION

1. Field of the Invention

The present invention relates to computer enclosures having drive brackets, and particularly to such computer enclosures which have compact configurations.

2. Description of Related Art

Storage devices are usually installed in a computer with drive brackets. The drive brackets are required to securely hold the storage devices and ensure that they run smoothly. The drive brackets should take up as little room as possible, to facilitate making the entire computer compact. Various kinds of drive brackets have been developed to meet these requirements.

A common arrangement is to have a large drive bracket and a small drive bracket separately formed. The drive brackets respectively receive two different sizes of disk drives. The drive brackets are combined together and mounted in the enclosure with screws. Assembly is complicated and time-consuming. Consequently, integrated drive cages that have different sized bays have been developed. However, the cages do not always retain disk drives securely. In addition, the cages occupy excessive space within the enclosure. The cages run against the trend toward miniaturization of computers.

Therefore, a new computer enclosure with a drive bracket that overcomes the above-mentioned problems is desired.

SUMMARY OF THE INVENTION

Accordingly, an object of the present invention is to provide a computer enclosure with a compact configuration.

Another object of the present invention is to provide a drive bracket which holds a disk drive securely and occupies minimal space.

In order to achieve the objects set out above, a computer enclosure in accordance with the present invention comprises a base, a removable first side plate and a drive bracket. The base has a front plate, a second side plate, a rear plate, and a bottom plate. The drive bracket is adapted to accommodate different sized disk drives. The drive bracket has a base plate and a pair of side walls. A rack is formed adjacent one of the side walls. A pair of shelves is respectively formed on the rack and the other side wall. A distance between the side walls is dimensioned to receive a large disk drive. A distance between the said other side wall and the rack is dimensioned to receive a small disk drive.

Other objects, advantages and novel features of the invention will become more apparent from the following detailed description when taken in conjunction with the accompanying drawings.

DETAILED DESCRIPTION OF THE INVENTION

Figure 1:
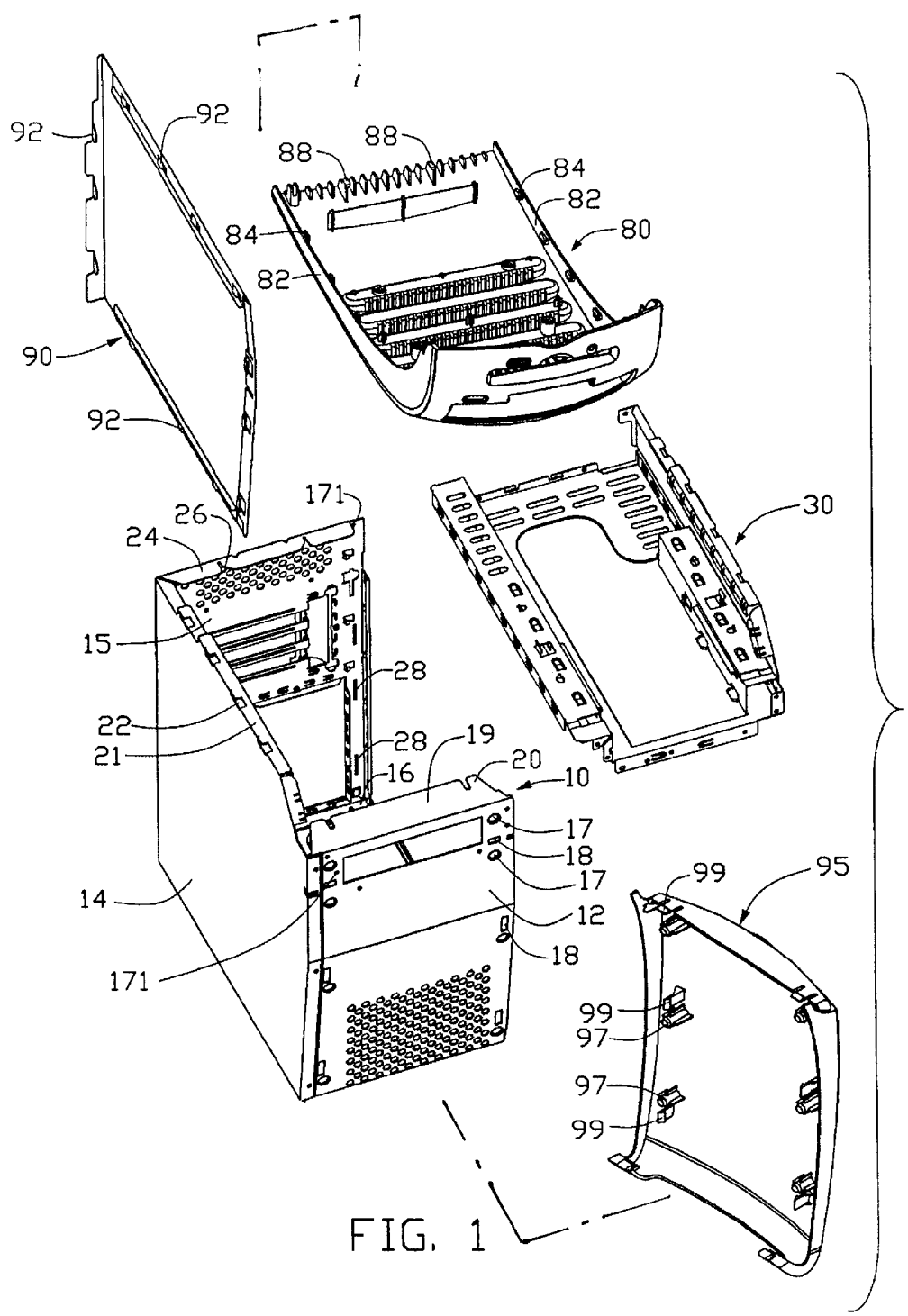
FIG. 1 is an exploded perspective view of a computer enclosure in accordance with the present invention.

FIG. 1 is an exploded view of a computer enclosure in accordance with a preferred embodiment of the present invention. The computer enclosure includes a base 10, a drive bracket 30, a removable first side plate 90, a top panel 80, and a front panel 95.

The base 10 comprises a front plate 12, a second side plate 14, a rear plate 15, and a bottom plate 16. The front plate 12 and the bottom plate 16 are formed as a single piece. The second side plate 14 and the rear plate 15 are formed as a single piece. A plurality of spaced locating holes 17 and a plurality of spaced locking holes 18 are defined at both of opposite side edges of the front plate 12. A pair of through holes 171 is defined in each of opposite sides of a top portion of the front plate 12. A fringe 19 is inwardly bent from a top edge of the front plate 12. A pair of tongues 20 is formed in opposite ends of the fringe 19 respectively. A fringe 21 is inwardly bent from a top edge of the second side plate 14. A plurality of spaced L-shaped slots 22 is defined in a junction of the fringe 21 and the second side plate 14. A plurality of vertically aligned slits 28 is defined at an edge of the rear plate 15 that is distal from the second side plate 14. A fringe 24 is inwardly bent from a top edge of the rear plate 15. A pair of spaced notches 26 is defined in the fringe 24. A further pair of through holes 171 (only one visible) is respectively defined in opposite sides of a top portion of the rear plate 15.

Figure 2:
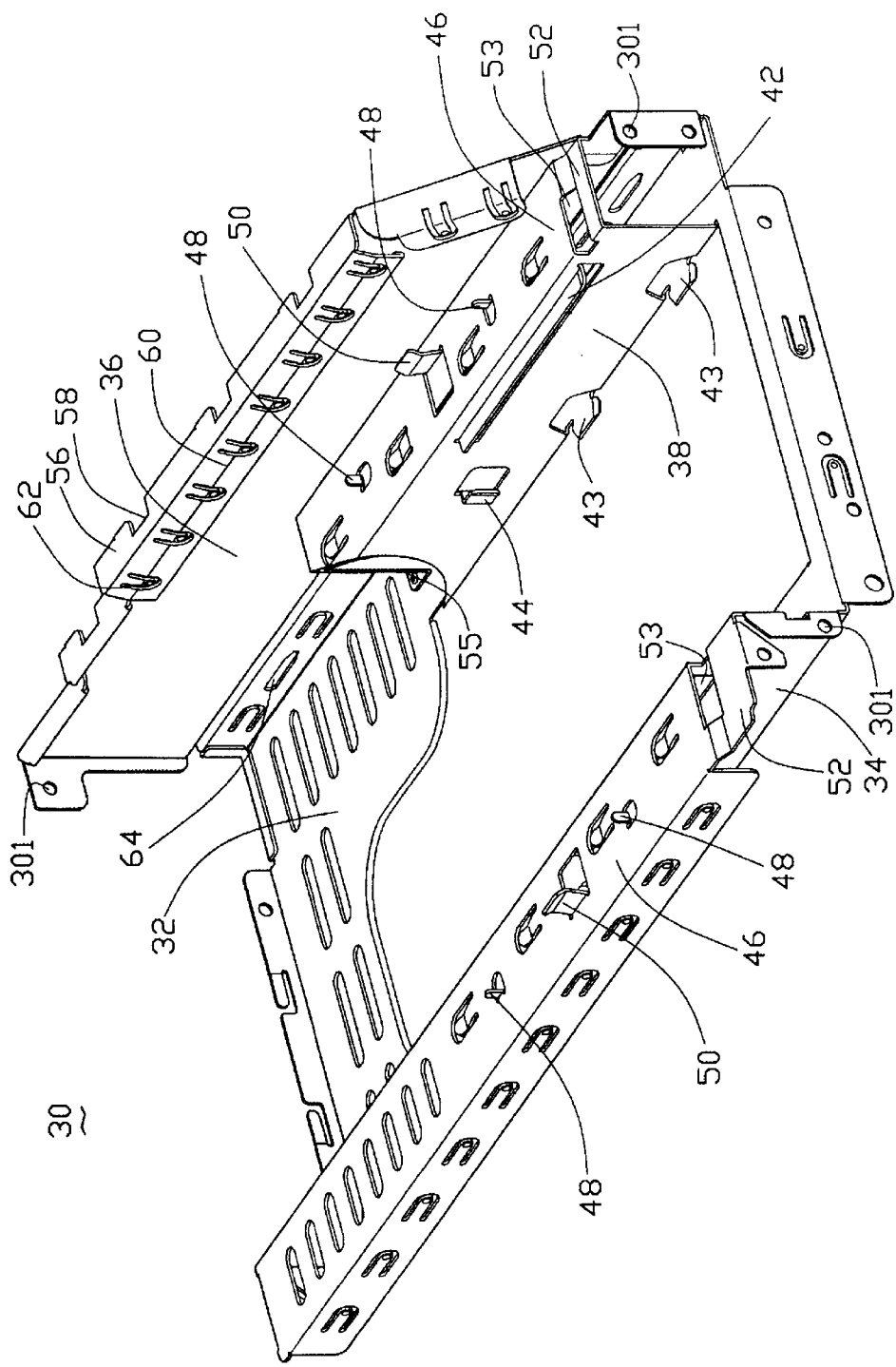
FIG. 2 is a perspective view of a drive bracket of the computer enclosure of FIG. 1.
Figure 3:
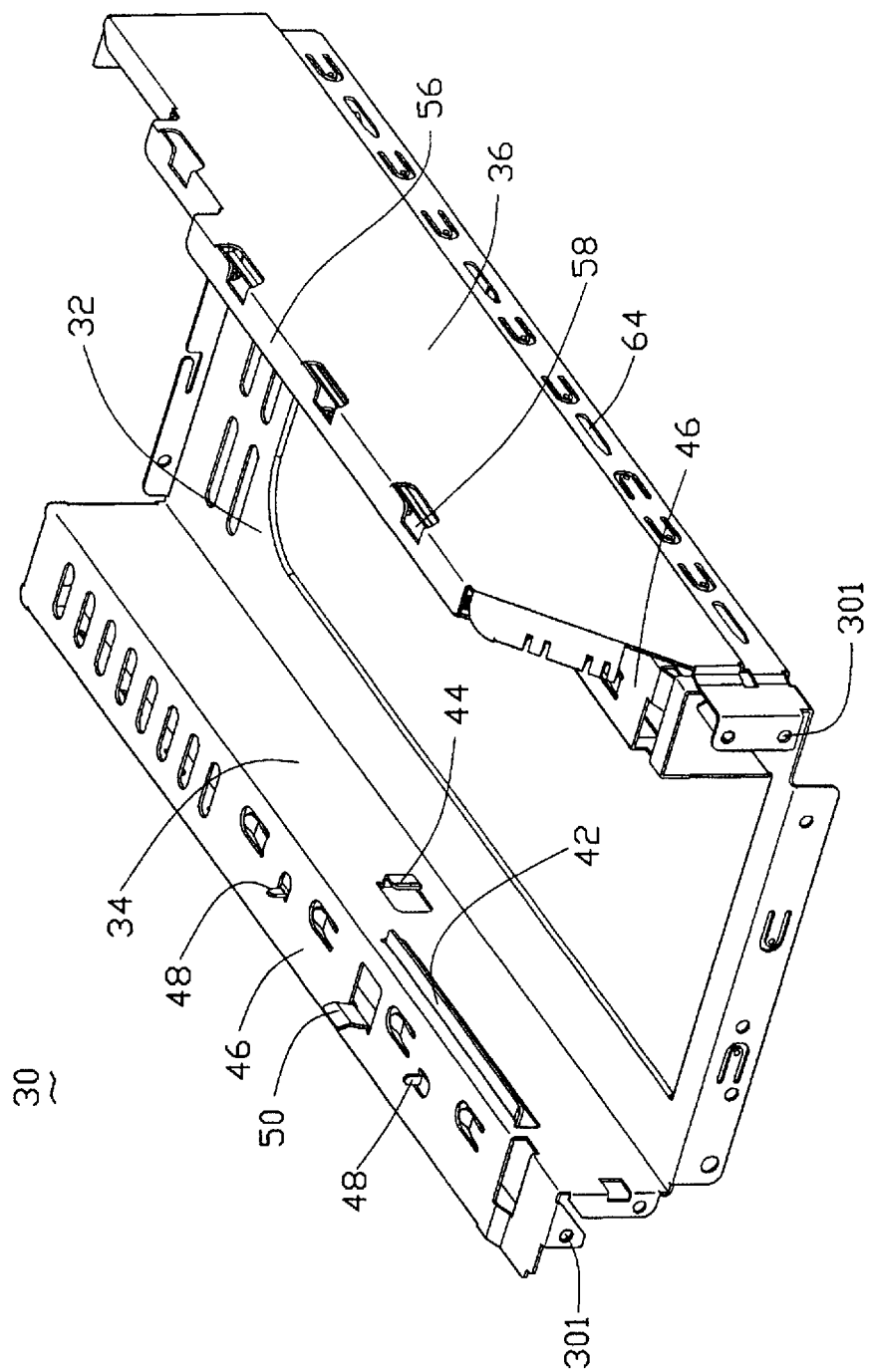
FIG. 3 is also a perspective view of the drive bracket of the computer enclosure of FIG. 1, but viewed from another aspect.

Referring to FIGS. 2 and 3, the drive bracket 30 has a generally rectangular base plate 32, a first side wall 34 and a second side wall 36. A distance between the side walls 32, 34 is dimensioned to accommodate a large disk drive (not shown). A rack 38 is stamped from the base plate 32 and formed adjacent the second side wall 36. A distance between the rack 38 and the first side wall 34 is dimensioned to accommodate a small disk drive (not shown). A pair of engaging holes 301 is defined in each of opposite sides of a front of the drive bracket 30. A further pair of engaging holes 301 (only one visible) is respectively defined in opposite sides of a rear of the drive bracket 30.

A height of the first side wall 34 is the same as a height of the rack 38. A height of the second side wall 36 is greater than the common height of the first side wall 34 and rack 38. A shelf 46 extends horizontally outwardly from a top edge of the first side wall 34. Another shelf 46 is horizontally formed at a top of the rack 38. The shelves 46 are coplanar, for supporting the large disk drive (not shown). A front end of each shelf 46 is depressed to form a platform 52. A slot 53 is defined in a junction of the platform 52 and the shelf 46. A plurality of locating tabs 48 is upwardly formed from each shelf 46, for supporting and securing the large disk drive. A pair of spring tabs 50 is upwardly formed from the shelves 46 respectively, for resiliently securing the large disk drive. A plurality of supporting tabs 43 extends inwardly from the base plate 32 at the first side wall 34 and at the rack 38. A pair of rails 42 extends horizontally inwardly from the first side wall 34 and from the rack 38, above the supporting tabs 43. A pair of L-shaped stops 44 is inwardly formed from the first side wall 34 and from the rack 38, rearwardly of the rails 42. The supporting tabs 43, rails 42 and stops 44 cooperate to hold the small disk drive (not shown) therebetween. A tail 55 is formed at a rear of the rack 38, and is fixed to the base plate 32 to reinforce the rack 38.

The second side wall 36 has a rim inwardly bent from a top edge thereof. The rim includes a horizontal first portion 56, and a generally vertical second portion 60 depending from an inner edge of the horizontal first portion 56. A profile of the second portion 60 is slightly arcuate. The second portion 60 is stamped to form a plurality of spring fingers 62. Each spring finger 62 has a nub (not labeled) embossed on an inner face of a free end thereof. A plurality of L-shaped slots 58 is defined in a junction of the first portion 56 and the second side wall 36. A plurality of spaced horizontal slits 64 is defined along a bottom portion of the second side wall 36.

Referring back to FIG. 1, the top panel 80 has a pair of fringes 82 depending from opposite longitudinal sides thereof respectively. A plurality of L-shaped hooks 84 is inwardly formed from each fringe 82, for engaging in the L-shaped slots 22, 58 respectively of the side plate 14 and the drive bracket 30. A pair of engaging bars 88 is inwardly formed at a rear end of the top panel 80, for engaging in the notches 26 of the rear plate 15.

The first side plate 90 has a plurality of hooks 92 inwardly formed around peripheral edges thereof, for respectively engaging in the slits 28 of the rear plate 15, the slits 64 of the drive bracket 30, and the bottom plate 16.

The front panel 95 has a plurality of locating posts 97 inwardly formed along opposite longitudinal sides thereof, for engaging in the locating holes 17 of the front plate 12. A plurality of clamps 99 is inwardly formed along the opposite longitudinal sides of the front panel 95, for engaging in the locking holes 18 of the front plate 12.

Figure 4:
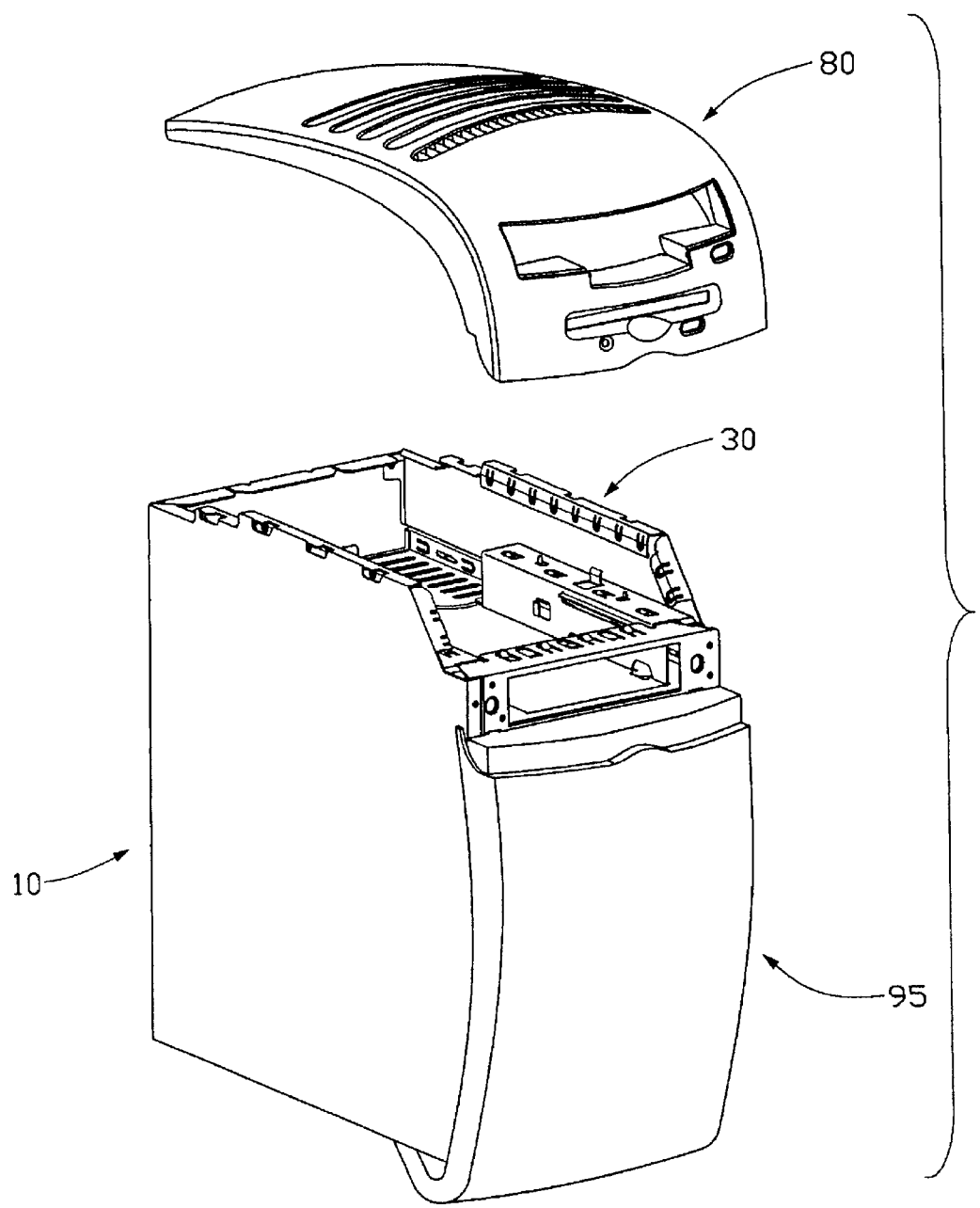
FIG. 4 is a partly assembled view of FIG. 1.
Figure 5:
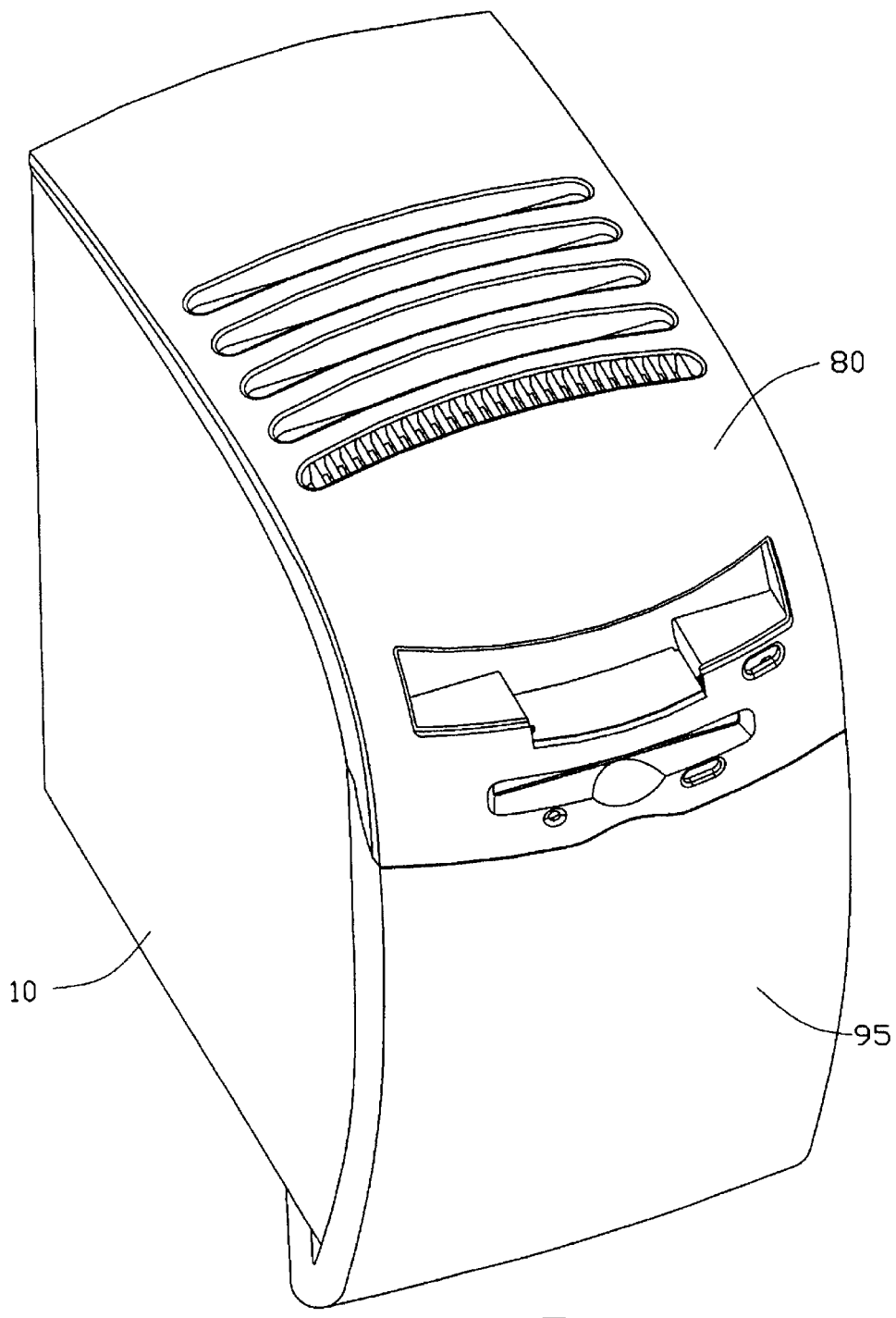
FIG. 5 is a fully assembled view of FIG. 1.

Referring to FIGS. 1, 4 and 5, in assembly, the drive bracket 30 is firstly mounted into the base 10. The slots 53 of the drive bracket 30 engagingly receive the tongues 20 of the front plate 12. The drive bracket 30 is then secured to the base 10 by conventional fastening means such as screws. The screws (not shown) are extended through the through holes 171 of the front and rear plates 12, 15 of the base 10 to threadedly engage in the engaging holes 301 of the drive bracket 30. The front panel 95 is placed onto the front plate 12. The locating posts 97 of the front panel 95 are fittingly received in the locating holes 17 of the front plate 12. The clamps 99 of the front panel 95 are resiliently received in the locking holes 18 of the front plate 12. Then, the first side plate 90 is placed onto the base 10. The hooks 92 of the first side plate 90 are respectively engaged in the slits 64 of the drive bracket 30, the slits 28 of the rear plate 15, and slits (not shown) of the bottom plate 16. Finally, the top panel 80 is placed on the base 10. The engaging bars 88 of the top panel 80 are received in the notches 26 of the rear plate 15. The L-shaped hooks 84 the top panel 80 are lockingly received in the L-shaped slots 22, 58 respectively of the side plate 14 and the drive bracket 30. Assembly of the computer enclosure is thus completed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A drive bracket adapted to accommodate different sized disk drives, comprising:
    a base plate having first and second side walls extending therefrom, a top edge of the first side wall having a shelf extending horizontally therefrom;
    a rack formed adjacent the second side wall, the rack having a horizontal shelf formed at a top thereof;
    locating means formed on the shelves adapted to support and secure a disk drive; and
    securing means formed on the rack and the first side wall adapted to secure a disk drive therebetween; wherein the shelves of the first side wall and the rack are substantially coplanar and are disposed lower than a topmost extremity of the second side wall, a distance between the first and second side walls is dimensioned to receive a large disk drive, and a distance between the first side wall and the rack is dimensioned to receive a small disk drive.

2. The drive bracket as described in claim 1, wherein a plurality of support members is formed on the base plate to support the small disk drive.

3. The drive bracket as described in claim 1, wherein a pair of rails is respectively formed on the first side wall and the rack to hold the small disk drive.

4. The drive bracket as described in claim 3, wherein a pair of stops is respectively formed on the first side wall and the rack rearwardly of the rails.

5. The drive bracket as described in claim 1, wherein a tail portion is formed at a rear of the rack, and the tail portion is fixed to the base plate to reinforce the rack.

6. The drive bracket as described in claim 1, wherein the locating means comprises a plurality of upwardly formed locating members.

7. The drive bracket as described in claim 1, wherein the second side wall has a rim inwardly formed therefrom.

8. The drive bracket as described in claim 7, wherein the rim includes a horizontal first portion, and a second portion depending from the first portion, and the second portion has an arcuate profile.

9. The drive bracket as described in claim 8, wherein a plurality of spring fingers is formed on the second portion of the rim, and each of the spring fingers has a nub formed at a free end thereof.

10. A computer enclosure, comprising:
    a removable first side plate;
    a base having a front plate, a second side plate, a rear plate, and a bottom plate; and
    a drive bracket adapted to accommodate different sized disk drives, the drive bracket having a base plate and a pair of side walls, a rack being formed adjacent one of the side walls, a pair of shelves being respectively formed on the rack and the other side wall of the side walls, a distance between the side walls being dimensioned to receive a large disk drive, a distance between said other side wall and the rack being dimensioned to receive a small disk drive.

11. The computer enclosure as described in claim 10, wherein each of the shelves of the drive bracket forms a platform at a front portion thereof, and a slot is defined at a junction of the platform and the shelf.

12. The computer enclosure as described in claim 11, a pair of tongues is inwardly formed at a top of the front plate, and the tongues are engagingly received in the slots of the shelves thereby securing the drive bracket to the front plate.

13. The computer enclosure as described in claim 10, wherein a plurality of support members is formed on the base plate, a pair of rails is respectively formed on the rack and on said other side wall, and a pair of stops is respectively formed on the rack and said other side wall rearwardly of the rails.

14. The computer enclosure as described in claim 10, wherein a tail portion is formed at a rear of the rack, and the tail portion is fixed to the base plate of the drive bracket to reinforce the rack.

15. The computer enclosure as described in claim 10, wherein the front plate and the bottom plate are formed as a single piece, and the second side plate and the rear plate are formed as a single piece.

16. The computer enclosure as described in claim 10, wherein the computer enclosure further comprises a front panel having a plurality of locating posts and a plurality of clamps formed thereon.

17. The computer enclosure as described in claim 16, wherein the front plate defines a plurality of locating holes and a plurality of locking holes respectively receiving the locating poles and the clamps of the front panel.

18. The computer enclosure as described in claim 10, wherein the computer enclosure further comprises a top panel having a plurality of hooks formed thereon for engaging with the base and the drive bracket.

19. The computer enclosure as described in claim 18, wherein a pair of engaging members is formed at a rear end of the top panel.

20. The computer enclosure as described in claim 19, wherein a pair of voids is defined in the rear plate, and the voids engagingly receive the engaging members of the top panel.

21. A one-piece drive bracket for receiving stacked small and large disk drives, comprising:

a horizontal base plate with opposite parallel first and second side walls vertically extending on two sides thereof;

a first shelf extending horizontally at a top edge of the first side wall;

a rack and an associated second shelf both stamped from the base plate, said rack being bent to vertically extend from the base plate and between the first and second side walls in a parallel relationship;

said second shelf horizontally extending at a top edge of the rack in coplanarity with the first shelf; wherein a smaller space is formed among the first side wall, the base plate and the rack for receiving the small disk drive, and a larger space is formed among the second side wall and both the first and second shelves for receiving the large disk drive.

\* \* \* \* \*